US012301552B2

(12) United States Patent
Aldrian et al.

(10) Patent No.: US 12,301,552 B2
(45) Date of Patent: May 13, 2025

(54) COMMUNICATION MODULE

(71) Applicant: AVL LIST GMBH, Graz (AT)

(72) Inventors: Andreas Aldrian, Haselsdorf-Tobelbad (AT); Christoph Wolf, Graz (AT); Zhendong Ma, Vienna (AT); Patrik Maier, Graz (AT); Samuel Sprung, Graz (AT)

(73) Assignee: AVL List GmbH, Graz (AT)

( * ) Notice: Subject to any disclaimer, the term of this patent is extended or adjusted under 35 U.S.C. 154(b) by 124 days.

(21) Appl. No.: 17/312,387

(22) PCT Filed: Dec. 12, 2019

(86) PCT No.: PCT/AT2019/060437
§ 371 (c)(1),
(2) Date: Jun. 9, 2021

(87) PCT Pub. No.: WO2020/118342
PCT Pub. Date: Jun. 18, 2020

(65) Prior Publication Data
US 2022/0021663 A1    Jan. 20, 2022

(30) Foreign Application Priority Data
Dec. 13, 2018  (AT) .............................. A 51106/2018

(51) Int. Cl.
*H04L 9/40*      (2022.01)
*H04L 12/40*     (2006.01)
(Continued)

(52) U.S. Cl.
CPC .... *H04L 63/0471* (2013.01); *H04L 12/40006* (2013.01); *H04L 12/4625* (2013.01);
(Continued)

(58) Field of Classification Search
None
See application file for complete search history.

(56) References Cited

U.S. PATENT DOCUMENTS 10,103,977 B2 * 10/2018 Bi .......................... H04L 41/342
10,433,134 B2 * 10/2019 Panje ....................... H04W 4/80
(Continued)

FOREIGN PATENT DOCUMENTS

CN        1520665 A      8/2004
CN      108833236 A     11/2018
(Continued)

OTHER PUBLICATIONS

Japan Patent Office; Examination Report issued in counterpart application 2021-533459; Date of Report Jan. 17, 2024.

*Primary Examiner* — Sithu Ko
(74) *Attorney, Agent, or Firm* — Dykema Gossett PLLC

(57) ABSTRACT

The invention relates to a communication module for transmitting data between at least one hardware component which is integrated into an internal network of a technical system and a back-end computer system which is connected to a packet-switched data network. The communication module has a device-proximal gateway and a network-proximal gateway, which are connected to one another via a point-to-point connection without intermediate stations. The network-proximal gateway provides a data transmission interface between the packet-switched data network and the point-to-point connection and the device-proximal gateway provides a data transmission interface between the point-to-point connection and the internal network.

16 Claims, 3 Drawing Sheets

(51) Int. Cl.
    *H04L 12/46*     (2006.01)
    *H04L 12/66*     (2006.01)
    *H04L 67/00*     (2022.01)
    *H04L 67/104*     (2022.01)

(52) U.S. Cl.
    CPC .......... *H04L 12/66* (2013.01); *H04L 63/0442* (2013.01); *H04L 63/0853* (2013.01); *H04L 67/104* (2013.01); *H04L 67/34* (2013.01); *H04L 2012/4026* (2013.01); *H04L 2012/40273* (2013.01)

(56) References Cited

U.S. PATENT DOCUMENTS

| | | | |
|---|---|---|---|
| 10,523,528 B2 * | 12/2019 | Attarwala | H04L 41/08 |
| 10,567,495 B2 * | 2/2020 | Gandhi | H04W 4/70 |
| 10,623,437 B2 * | 4/2020 | Allison | H04W 12/08 |
| 2003/0147534 A1 | 8/2003 | Ablay et al. | |
| 2005/0141706 A1 | 6/2005 | Regli et al. | |
| 2012/0127928 A1 | 5/2012 | Ichihara | |
| 2018/0115528 A1 * | 4/2018 | Rotvold | H04W 12/088 |
| 2018/0219944 A1 | 8/2018 | Kwon et al. | |
| 2019/0052480 A1 * | 2/2019 | Skidmore | H04L 12/4625 |
| 2019/0238555 A1 * | 8/2019 | Buffard | H04L 63/123 |
| 2019/0268376 A1 * | 8/2019 | Park | H04L 63/0428 |
| 2019/0312855 A1 * | 10/2019 | Sharma | H04L 63/123 |
| 2020/0036554 A1 * | 1/2020 | Iwata | H04L 41/0668 |
| 2021/0075807 A1 * | 3/2021 | Park | H04L 12/40176 |
| 2021/0374598 A1 * | 12/2021 | Ben-Ezra | G06N 20/00 |

FOREIGN PATENT DOCUMENTS

| | | |
|---|---|---|
| EP | 3297247 A1 | 3/2018 |
| JP | 2010527480 A | 8/2010 |
| JP | 2015023375 A | 2/2015 |
| JP | 2016139883 A | 8/2016 |
| JP | 2017208859 A | 11/2017 |
| JP | 2018110374 A | 7/2018 |
| WO | 2005050933 A1 | 6/2005 |
| WO | 2015089457 A1 | 6/2015 |

* cited by examiner

COMMUNICATION MODULE

CROSS-REFERENCE TO RELATED APPLICATIONS

This application is a national stage filing based upon International PCT Application No. PCT/AT2019/060437, filed 12 Dec. 2019, which claims the benefit of priority to Austria application No. A 51106/2018, filed 13 Dec. 2018.

BACKGROUND

The invention relates to a communication module for data transmission between at least one hardware component, which is integrated into an internal network of a technical system, and a back-end computer system, which is connected to a packet-switched data network. The invention further relates to a technical system with such a communication module and methods that can be carried out with such systems.

Due to the advances in the development of "intelligent" hardware systems and their use in technical systems in industrial, professional and private environments, protecting data against unauthorized access and manipulation has become considerably more important. One of the reasons for this is that data manipulation, such as a hacker attack on embedded hardware systems, has direct effects on the behavior of these systems and can not only impair the integrity and function of these systems, but also pose a threat to the life and limb of the user. Examples are steering or braking systems in autonomous, semi-autonomous and conventional vehicles, control devices in aircraft or switchgear in infrastructure facilities, such as for power supply. Malicious manipulation of the functions of such systems can not only pose a threat to individuals but also to the general public.

In addition, many hardware systems generate numerous data from which, for example, information about the behavior, whereabouts, or even about the state of health of users can be evaluated (for example in the case of data from fitness trackers or the like). Examples of such data also include telemetry data from (autonomous) vehicles, sensor and control data from industrial systems, research data from which information about research projects from competing companies or institutions can be derived, communication data, etc. There is a legitimate interest in all such data owners that these data cannot be viewed or used by third parties without authorization.

Technical systems, such as a (possibly autonomous) vehicle, a machine or machine arrangement in an industrial environment, a transport device, a testing or measuring device, such as an (engine) test bench or technical monitoring devices usually contain a large number of hardware components that communicate with one another via an internal network (or possibly several internal networks) in order to accomplish the task placed on the technical system. The hardware components usually include sensors and actuators via which the technical system interacts with the (real) environment. So that such complex tasks can be implemented by the hardware components, they are each equipped with their own (micro)processors and memory units that control the functions of the hardware components according to a program logic.

A substantial part of this program logic is usually stored in a non-volatile memory, for example a flash memory, so that it is available every time the hardware component is started or initialized. This part is commonly referred to as "firmware." Although the firmware remains unchanged during the operation of the hardware, changes are still possible, for example if an old version of the firmware is replaced by a new version. The new version is usually provided by the manufacturer of the hardware component from a back-end computer system via a packet-switched data network, in particular the Internet. The firmware can be updated either as a result of user intervention, it can be triggered by the hardware component or by another component of the technical system, or it can be triggered by the back-end computer system. One attack strategy is to exchange the firmware for a corrupted version while it is being transmitted over the Internet (or another packet-switched data network) and thereby obtain (remote) access to the functionality of the hardware component. In the case of unencrypted transmission, this is relatively easy for technically adept perpetrators to do, but an attack can also be successful with encrypted transmission, for example in the form of a man-in-the-middle attack or if one of the transmission components, via which the encryption or decryption takes place, is hacked.

Another security aspect relates to the transmission of data generated by a hardware component to the back-end computer system. Such data can be telemetry or sensor data, for example, which are transmitted to the back-end computing system for maintenance or monitoring purposes, for example. On the one hand, this transmission should be bug-proof for reasons of data security; on the other hand, it must also be possible to rule out manipulation of the data. Targeted manipulation of the data would make it possible, for example, to simulate a false hazardous situation to the back-end computing system, for example to trigger a (false) reaction or a false alarm.

The object of the present invention is to provide devices and methods by which data can be transmitted in a tamper-proof and bug-proof manner between hardware components that are embedded in technical systems and a back-end computer system that is connected to the Internet or another packet-switched data network.

SUMMARY OF THE INVENTION

These and other objects are achieved according to the invention by a communication module of the type mentioned at the outset, which has a device-proximal gateway and a network-proximal gateway, which are connected to one another via a point-to-point connection without intermediate stations, wherein the network-proximal gateway provides a data transmission interface between the packet-switched data network and the point-to-point connection and wherein the device-proximal gateway provides a data transmission interface between the point-to-point connection and the internal network. In this case the point-to-point connection represents a "bottleneck" that cannot be rerouted and prevents an attack coming from the packet-switched data network. The communication between the device-proximal and the network-proximal gateway is strictly defined and a breakout is not possible. Since the point-to-point connection without intermediate stations does not allow routing, it is not possible for an attacker to address any component by rerouting the communication. Even if an attacker succeeded in circumventing or deactivating the security functions of the network-proximal gateway, he still cannot gain access to the internal network or the hardware components.

Advantageously, the device-proximal gateway can have a gateway security module and/or the network-proximal gateway can have a gateway security module. Such gateway security modules allow the implementation of complex encryption and signature processes in a hardware-proximal manner.

In a preferred embodiment, at least one gateway security module can have a card interface for a processor chip card. This facilitates the series production of the gateways, since the specific security features (in particular the definition and/or generation of the cryptographic key, the selection and definition of the security protocols, etc.) can be defined in the processor chip card according to a cryptographic system. The processor chip card can be purchased from third-party manufacturers who specialize in this technical field, which facilitates the development of the gateways.

The invention further relates to a technical system with a corresponding communication module, wherein the technical system further comprises at least one hardware component and at least one internal network. According to the invention, very complex technical systems, for example (autonomous) vehicles, industrial systems, transport devices, test benches or measuring devices, can be secured against data manipulation and data espionage.

In an advantageous embodiment, the hardware component can have a security controller with an integrated cryptoprocessor, a non-volatile memory and a volatile memory. This enables (additional) end-to-end encryption of the data transmitted between a back-end computing system or another authorized data transmitter or data receiver and the hardware component (or vice versa) on the one hand, and, on the other hand, authenticity can be achieved using digital signatures, for example, and the authenticity and integrity of the data can be checked and ensured both by the hardware component itself and by the back-end computer system. Since a security controller is built into the hardware component, the data can be encrypted, for example, in such a way that not even the manufacturer of the communication module or the back-end computer system could decrypt the data. For example, the data can be encrypted for an authorized data receiver (for example the owner of the technical system or another authorized person) who can retrieve the encrypted data from the back-end computer system and then decrypt it.

In a further advantageous embodiment of the invention, the technical system can be an autonomous, semi-autonomous or conventional vehicle according to one of the autonomy levels 0 to 5. The classification of the autonomy levels relates to the well-known standard SAE J3016, which is commonly used in this field and is issued by SAE International, in the version valid at the time of the earliest filing date of the patent family in question. Data manipulation can have devastating consequences, especially in vehicles with higher autonomy levels, so that there is a particular need for high-quality security solutions in this area.

The technical system can advantageously be a machine arrangement controlled by an automation system, in particular a test bench. Various hardware components that have sensors and actuators are used in numerous industrial applications that are controlled by automation systems. According to the invention, these hardware components can be "remotely serviced," wherein on the one hand the firmware or other application software and, for example, parameter data can be updated from a back-end computer system. On the other hand, data can also be transmitted from the hardware component to the back-end computing system, for example telemetry data, with which, for example, malfunctions or maintenance requirements can be recognized.

The invention further relates to a method for the transmission of device data of a hardware component, which is integrated in an internal network of a technical system, to a back-end computer system which is connected to a packet-switched data network, the method being characterized by the following steps:
  transmitting the device data from the hardware component via the internal network to the device-proximal gateway,
  transmitting the device data from the device-proximal gateway via the point-to-point connection to the network-proximal gateway,
wherein the device data are converted into an encrypted instance of the device data by the device-proximal gateway or the network-proximal gateway, and
  transmitting the encrypted instance of the device data from the network-proximal gateway via the packet-switched data network to the back-end computer system.

Device data can be any data that are measured or created by the hardware component or can be stored in a device memory of the hardware component. The term "device data" encompasses both the unencrypted device data and device data that are available in encrypted form and which are also referred to herein as the "encrypted instance" of the device data. The "encrypted instance" of the device data is therefore data from which the unencrypted device data can be calculated using the respective cryptographic key and the corresponding cryptographic method. If necessary, the device data can be encrypted with overlays several times. For example, the hardware component can encrypt the device data according to its own encryption protocol, which, if necessary, can be completely separate and independent of the functionality of the communication module. In this case, the device data are already transmitted as an encrypted instance to the device-proximal gateway of the communication module. The communication module then creates another encrypted instance of this device data.

The method can advantageously comprise the following steps: creating an encrypted instance of the device data using a public key of a receiver of the data, in particular the back-end computer system, by the device-proximal gateway, preferably using the gateway security module of the device-proximal gateway, or by the network-proximal gateway, preferably using the gateway security module of the network-proximal gateway. The encryption can be carried out either by the hardware component, by the device-proximal gateway or by the network-proximal gateway, wherein the higher the security, the fewer unencrypted transmission steps that have to take place. If necessary, additional encryption and decryption steps can also be provided, for example, the transmission between the device-proximal gateway and the network-proximal gateway via the point-to-point connection can be protected by an additional encryption that is applied between the device-proximal gateway and the network-proximal gateway (or also between the hardware component and the network-proximal gateway). This can be particularly advantageous if the device data is only encrypted by the network-proximal gateway using the public key of the back-end computing system.

The terms "public key" and "private key" denote key pairs according to asymmetric cryptosystems (both in connection with encryption/decryption and in connection with digital signatures) in a known manner.

In an advantageous embodiment, the step of transmitting the encrypted instance via the packet-switched data network can include transmitting the encrypted instance to a broker, and can take place in accordance with a protocol that functions purely via push mechanisms. In this way, the network-proximal gateway can be additionally protected against hacker attacks, since any inbound traffic (i.e. data transmission initiated "from outside" via open ports) can be prevented with such protocols.

Advantageously, the network-proximal gateway can encrypt the encrypted instance of the device data before it is transmitted over the packet-switched data network in accordance with a network encryption protocol, wherein proven protocols can be used. This locks the data with a further layer of security against unauthorized access. This encryption can be carried out by the gateway security module of the network-proximal gateway.

According to a further advantageous embodiment, the encrypted instance of the device data can contain check data which allow the back-end computing system and/or another authorized data receiver to check the integrity and/or authenticity of the device data. Such check data can, for example, use checksums (hashes) and digital signatures in a manner known per se, wherein it is possible, if necessary, for these data to be encrypted together with the device data in a data envelope.

In a further aspect, the invention relates to a method for storing update data in a device memory of a hardware component that is integrated into an internal network of a technical system, wherein the update data for the hardware component is provided by a back-end computer system and the method comprises the following steps:

receiving an encrypted instance of the update data by the network-proximal gateway via the packet-switched data network from the back-end computer system, transmitting the update data from the network-proximal gateway via the point-to-point connection to the device-proximal gateway, transmitting the update data to the hardware component via the internal network, wherein the encrypted instance of the update data is decrypted by the device-proximal gateway or the network-proximal gateway, and storing the update data in the device memory of the hardware component.

As a result, update data, for example current firmware or parameter data, can be transmitted from the back-end computer system to the hardware component in a secure manner. If necessary, a further independent encryption of the device data between an authorized data transmitter and the hardware component can again be provided.

Update data can be any data that can be stored in a device memory of the hardware component. The term "update data" encompasses both the unencrypted update data and update data which are present in encrypted form and which are also referred to herein as an "encrypted instance" of the update data. Any data from which the unencrypted update data can be calculated with the aid of the respective cryptographic key and the corresponding cryptographic method is therefore referred to as an "encrypted instance" of the update data.

The update data can, on the one hand, have been encrypted by an authorized data transmitter with a public key of the hardware component or the device-proximal gateway or the network-proximal gateway and have already been transmitted in encrypted form to the back-end computer system. In this case, the back-end computer system only acts as an intermediary, which itself has no access to the unencrypted data. On the other hand, the encrypted instance of the update data can also be created by the back-end computer system using a public key of the hardware component, the device-proximal gateway, or the network-proximal gateway.

The method can advantageously comprise the following steps: decrypting the encrypted instance of the update data by the network-proximal gateway, preferably using the gateway security module of the network-proximal gateway or by the device-proximal gateway, preferably using the gateway security module of the device-proximal gateway.

If the hardware component is provided with a security controller, complete end-to-end encryption can also be implemented. On the other hand, the data can also be transmitted to hardware components without their own security controller in a very secure manner, since the unencrypted data are only transmitted in the internal network, for example via an internal field bus system such as a CAN bus, and possibly via the point-to-point connection. If necessary, the transmission between the network-proximal gateway and the device-proximal gateway via the point-to-point connection can in turn be protected by additional encryption that is established between the device-proximal gateway (or the hardware component) and the network-proximal gateway. The decryption is preferably carried out by the device-proximal gateway or the hardware component, both of which have no direct connection to a public network. The method can also be carried out with certain restrictions with a simplified communication module in which the device-proximal gateway does not have its own gateway security module.

The update data can advantageously include firmware, application software and/or parameter data of the hardware component.

In a further advantageous embodiment, the step of receiving can include the retrieval of the encrypted instance of the update data from a broker and can take place in accordance with a protocol which functions purely via push mechanisms.

According to a further embodiment it can be provided that the encrypted instance of the update data contains check data which allow the gateway security module of the device-proximal gateway, and/or the gateway security module of the network-proximal gateway and/or the security controller of the hardware component, to check the integrity and/or authenticity of the update data. With the help of a check of the authenticity and integrity of the received instance of the update data, for example by means of digital signatures according to the cryptographic system used by the security controller or gateway security module, it can be ensured that, for example, the exchange of firmware (which usually takes place by so-called "flashing" of the corresponding device memory) is only carried out if the trustworthiness of the data from the security controller (or gateway security module) is ensured.

Definitions

In connection with the present disclosure, a "technical system" is a device which has at least one internal network and at least one hardware component that is capable of communication via this internal network.

In connection with the present disclosure, an "internal network" is a communication infrastructure of the technical system that is preferably limited to the technical system and that is suitable for the exchange of data between hardware components. Depending on the type of technical system, the internal network can function according to a routable protocol or a non-routable protocol.

In connection with the present disclosure, a "hardware component" is considered to be a technical unit which has at least one processor or microcontroller and a memory unit and which is capable of communication via the respective internal network.

In connection with the present disclosure, "firmware" refers to a program logic stored in a memory of the hardware component, which is required for the operation of the hardware component. Depending on the complexity of the hardware component, the firmware can fully define the operation of the hardware component, possibly using changeable parameters, or it can allow the hardware component to execute application programs.

In connection with the present disclosure, "application software" of the hardware component generally refers to a program logic that can be executed by the hardware component.

In connection with the present disclosure, data that represent values that influence the operation of the hardware component are referred to as "parameter data" of the hardware component.

In connection with the present disclosure, a "back-end computer system" is a computer infrastructure in which data relating to the hardware component is stored. The back-end computing system is able to communicate via the packet-switched data network in order to transmit data via this packet-switched data network to the technical system, or via the communication module of the technical system to the hardware component, and to receive data from this hardware component via the communication module of the technical system.

In connection with the present disclosure, a "security controller" is a unit which can preferably be designed as hardware, in particular as a microchip, wherein the security controller expands a hardware component to include basic security functions. The basic security functions relate in particular to the generation of cryptographic keys, their secure storage (an extraction of private keys should be prevented), the encryption and decryption of data and the handling of digital signatures. The security controller contains at least one unique identifier that can be used to identify the hardware component. For reasons of size optimization, it is preferable to design the security controller as a single microchip that is built into the respective hardware unit. If the size of the hardware unit allows it, however, it is also possible to use a system with a card interface and a processor chip card, as described for the gateway security module defined below.

A security controller preferably comprises at least one cryptoprocessor. The cryptoprocessor can preferably have a random number generator, at least one key generator (e.g. according to RSA), at least one hash generator (e.g. according to a secure hash algorithm—SHA), and at least one encryption/decryption/signature unit. Furthermore, the security controller usually has a non-volatile and/or a volatile memory. For example, an endorsement key and a storage root key can be stored in the non-volatile memory. A cryptographic key assigned to the security controller is referred to as an endorsement key, and is preferably stored in a non-changeable manner in the non-volatile memory during production. A storage-root-key is a cryptographic key stored in the protected, non-volatile memory, which can, however, be changed using special functions, for example if the security controller is taken over by a new user. For security reasons, the endorsement key and the storage-root-key must not be able to leave the secure memory. Therefore, the cryptoprocessor must be able to use these keys in order to be able to carry out the cryptographic operation. For example, platform configuration registers, attestation identity keys and other stored keys can be stored in the volatile memory of the security controller.

Examples of security controllers include trusted platform modules (TPM) according to the TCG specification of the Trusted Computing Group. In connection with the present disclosure, it is assumed that a person skilled in the art has detailed knowledge of the TCG specification in the version valid at the time of the earliest filing date of the present patent family.

In connection with the present disclosure, a "cryptoprocessor" is a microprocessor that combines basic cryptographic functions, in particular secure data communication, encryption and decryption, authentication and/or the management of cryptology keys.

In connection with the present disclosure, a "gateway security module" is a hardware unit that expands a gateway with basic security functions. The gateway security module can have a similar structure to a security controller, or even be structurally identical. The gateway security module can have a card interface into which a processor chip card can be inserted which contains a substantial part of the gateway security module and in which in particular the basic security functions can be coded. In this way, for example in series production of the gateway security module, a gateway security module that is unique in terms of hardware can be created through combination with the respective processor chip card.

It should be noted that the distinction between the terms "gateway security module" and "security controller" does not imply a difference in terms of functionality or hardware, but merely defines their assignment (one to a hardware unit, the other time to a gateway). In particular, the gateway security module and security controller can be designed to be identical or different in terms of functionality and/or hardware. A plurality of gateway security modules from different gateways can each be designed as different hardware, and the security controllers from different hardware units do not have to be identical, but can have a different design. All features that are described herein in connection with the security controller can thus also be applied to the gateway security module and vice versa, unless expressly stated otherwise.

In connection with the present disclosure, a "processor chip card" is a card which can be plugged or inserted into a card interface—usually made of plastic—and which is provided with a built-in integrated circuit (chip). The integrated circuit comprises hardware logic, at least one memory and at least one microprocessor. Processor chip cards are controlled by special card readers, which are referred to as "card interfaces" in connection with the present disclosure. Processor chip cards are often referred to as "smart cards" or "integrated circuit cards (ICC)" in common parlance. The processor chip card often has a credit card format, but it can also have other formats, such as a SIM card format (for example standard SIM, mini SIM, micro SIM, nano SIM). If necessary, the processor chip card can also be installed directly in the corresponding device in the form of an embedded SIM and cannot be exchanged.

In connection with the present disclosure, a "hardware security module" (HSM) is generally referred to as an internal or external peripheral device which in a computer infrastructure (such as the back-end computer system described herein) serves for the efficient and secure execution of cryptographic operations or applications. This makes it possible, for example, to ensure the trustworthiness and integrity of data and the associated information IT systems.

In connection with the present disclosure, a "cryptographic key" is generally referred to as information that parameterizes and controls a cryptographic algorithm. In particular, a distinction is made between decryption keys and encryption keys, which are each linked to one another. In symmetrical encryption systems, the decryption key and the encryption key are identical. Asymmetric encryption systems, on the other hand, use key pairs that consist of a public key and a private key. Asymmetric cryptographic keys can be used not only for encryption and decryption, but also for digital signing.

In connection with the present disclosure, the term "cryptographic system" or "cryptosystem" is used generically both for systems for encryption and decryption, for key exchange methods and for methods for digital signature. A known example of a cryptographic system is the RSA cryptosystem, which operates on a one-way function on a prime number basis. Further examples of cryptographic systems are based on elliptic curve cryptography (ECC). Examples include elliptic curve Diffie-Hellman (ECDH), elliptic curve integrated encryption scheme (ECIES), also called integrated encryption scheme (IES), elliptic curve digital signature algorithm (ECDSA), and ECMQV, a protocol for key agreement proposed by Menezes, Qu, and Vanstone.

In connection with the present disclosure, a "network encryption protocol" is a network protocol that guarantees encrypted data transmission over a computer network. Such a network encryption protocol can consist, for example, of a key exchange protocol and symmetrical methods that ensure the confidentiality and integrity of the transmitted messages. Examples of standards for network encryption protocols include transport layer security (TLS), secure shell (SSH), IPsec, WPA2.

In connection with the present disclosure, a "gateway" is a component that establishes a connection between two communication systems and, in particular, between two network systems of different protocols (the same or different layers in the OSI model are to be assigned).

In connection with the present disclosure, a "point-to-point connection" is generally understood to be a direct connection path without intermediate stations. This includes, for example, communication in the lower network layers 1-3 in the OSI model. The communication via the point-to-point connection is preferably carried out according to a non-routable protocol. An example of such a connection is a direct connection via a serial bus system, for example a Universal Serial Bus (USB).

In connection with the present disclosure, a "method that works purely via push mechanisms" is a method in which communication is always mediated via an intermediate broker in accordance with a publisher-subscriber model. In particular, it is not necessary to establish a direct end-to-end connection. Examples of such methods are communication methods that are structured according to the MQTT specification ("message queuing telemetry transport"), in particular according to the MQTT specification in the version valid at the time of the earliest filing date of the patent family in question.

In connection with the present disclosure, a "broker" is a server that manages the messages that are provided or retrieved according to a publisher-subscriber model or the method that works purely via push mechanisms.

BRIEF DESCRIPTION OF THE DRAWINGS

In the following, the present invention is described in greater detail with reference to FIGS. 1 to 3, which show exemplary, schematic and non-limiting advantageous embodiments of the invention. In the drawings.

DETAILED DESCRIPTION

Figure 1:
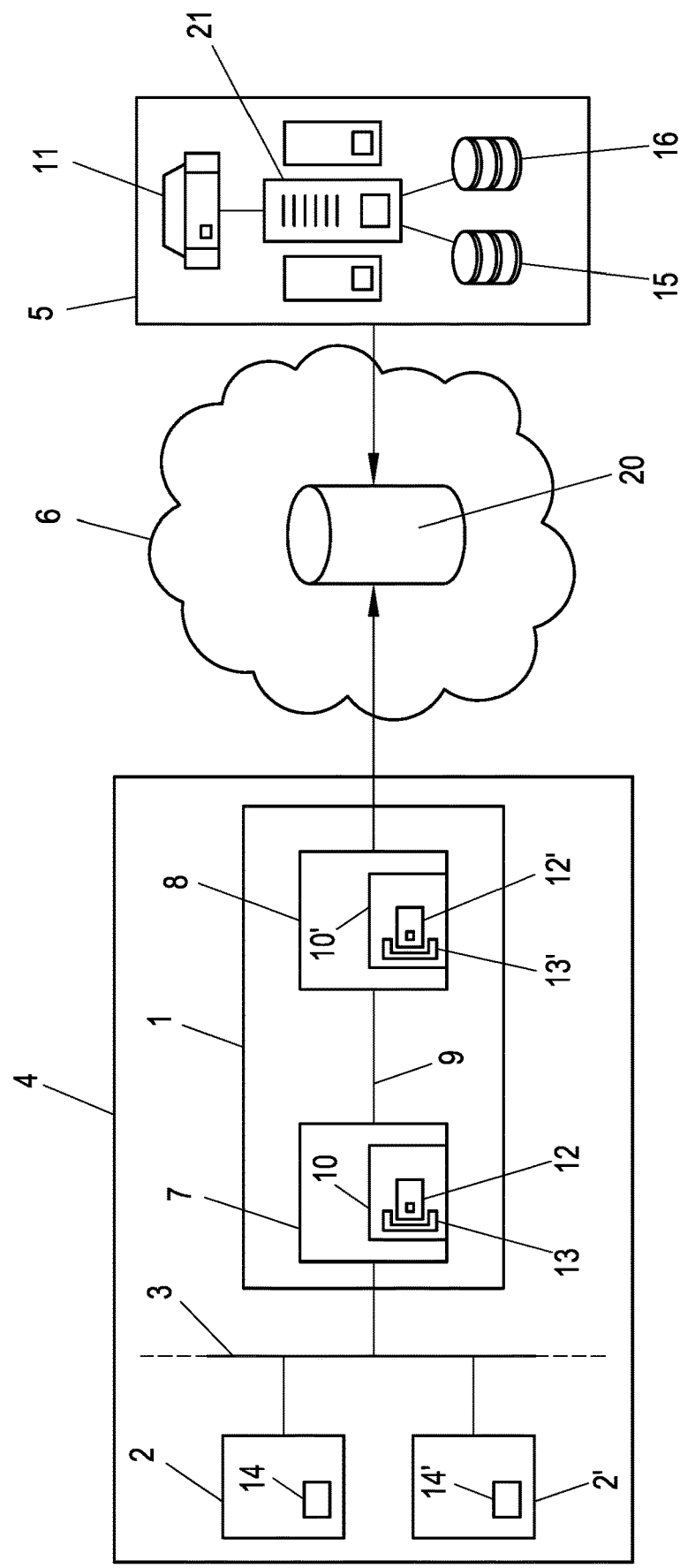
FIG. 1 is a schematic representation of the components involved in a data transmission between a back-end server and a hardware component according to the invention in a block diagram.

FIG. 1 is a schematic representation of the essential entities that are provided in the context of the methods and devices according to the invention. A technical system 4 has a communication module 1, an internal network 3 and a number of hardware components 2, 2', which are connected to one another and to the communication module 1 via the internal network 3. Each of the hardware components 2, 2' shown in FIG. 1 has a security controller 14, 14', but conventional hardware components that do not have a security controller can also be connected to the internal network 3 in the technical system 4.

The communication module 1 comprises a device-proximal gateway 7 and a network-proximal gateway 8, which are connected to one another by means of a point-to-point connection 9. The device-proximal gateway 7 establishes a communication connection between the internal network 3 and the point-to-point connection 9 and the network-proximal gateway 8 establishes a communication connection between the point-to-point connection 9 and a packet-switched data network 6. The packet-switched data network 6 can be any local or wide area network, in particular the Internet.

The connection via the packet-switched data network 6 is used by the technical system 4 in particular to exchange data with a computer arrangement referred to as the back-end computer system 5. The back-end computer system 5 has a computer infrastructure referred to as a "data center" 21, which may be, for example, a server-based computer network from a manufacturer or supplier of the hardware components 2, 2'. The back-end computer system 5 further comprises one or more databases in which data relating to the hardware components 2, 2' are stored. A software repository 15 and a firmware repository 16, in which software or firmware for hardware components are stored in encrypted form, are shown symbolically in FIG. 1.

The communication between the back-end computer system 5 and the network-proximal gateway 8 of the communication module 1 of the technical system 4 is carried out via a broker 20 and carried out according to a protocol that is based purely on push mechanisms. Such protocols, for example in accordance with the MQTT specification, allow the implementation of firewall guidelines that block incoming traffic on the part of the communication module 1. A manipulation of the system via web services and the establishment of an end-to-end connection to the communication module 1 can thus be excluded. In the case of protocols that work purely via push mechanisms, such as the MQTT protocol, as is known no direct end-to-end connection is established, but rather the communication is always mediated via the intermediate broker 20, which receives data from a "publisher," and makes it available for one or more "subscribers," wherein preferably a certificate-based identification of the publisher and/or subscriber and possibly an encryption of the data can be provided. Each endpoint "opens" the communication to the broker 20 of its own accord, and this is not initiated "from outside." Since both communication partners can act both as subscribers and publishers, it is possible to exchange data in both directions without having to set up a potentially vulnerable web service. For this purpose, a connection to the broker 20 is established at defined intervals from the communication module 1 (i.e. from the network-proximal gateway 7) and either data are provided for retrieval by authorized third parties (in particular from the back-end computer system 5) (i.e. the communication module 1 acts as a publisher) or data are retrieved from third parties (i.e. the communication module 1 acts as a subscriber). In an analogous manner, the back-end computer system 5 can act both as a publisher and as a subscriber to receive data from the communication module 1 (or from a hardware component 2 "lying behind it") or to transmit data to the communication module 1 (or to the hardware component 2).

The security controllers 14, 14' of the hardware components 2, 2' can be designed, for example, as an integrated circuit or hardware chip, which makes it possible to equip even relatively small hardware components with such a security controller 14, 14'. The security controller 14, 14' expands the hardware components 2, 2' to include basic security functions in accordance with at least one cryptographic system. The security controllers can, for example, correspond to a specification of the Trusted Computing Group (TCG) and be designed as a "trusted platform module" (TPM).

The device-proximal gateway 7 has a gateway security module 10, which includes a card interface 13 for a processor chip card 12, and the network-proximal gateway 8 has a further gateway security module 10' with a card interface 13' and a processor chip card 12'. If necessary, to simplify the hardware effort the gateway security module 10 of the device-proximal gateway 7 can be dispensed with, in which case the corresponding encryption and decryption functions of the security modules 14, 14' of the hardware components 2, 2' and/or the gateway security module 10' of the network-proximal gateways 8 are taken over.

The security controllers 14, 14' of the hardware components 2, 2' and the gateway security modules 10, 10' of the gateways 7, 8 each contain a unique identifier which is used to identify the corresponding hardware component or the respective gateway. Corresponding cryptographic systems that can be used by the security controllers and gateway security modules are known in the art.

The security functions in the back-end computer system 5, in particular the management and distribution of cryptographic keys, the encryption, decryption and digital signing, can be managed by a hardware security module 11. The hardware security module 11 can also have the public keys of the security controllers 14, 14' and gateway security modules 10, 10' in the system. However, this is not a mandatory requirement, since the back-end computer system 5 can also receive and store data that it is not allowed to decrypt itself, for example if these data (collected by the hardware component) are intended for a third party (referred to herein as the authorized data receiver) and are encrypted with its public key. On the other hand, update data handled by the back-end computing system 5 can originate from a third party (which is also referred to herein as an authorized data transmitter) and have already been encrypted by the latter.

The units provided for the cryptographic method, in particular the gateway security modules 10, the security controllers 14 and the hardware security modules 11, can optionally support a plurality of different cryptographic systems.

The arrangement described above allows an extremely effective and strong protection of communication connections between the hardware components 2, 2' and the back-end computer system 5 (or a third-party authorized data receiver and/or data transmitter). An exemplary communication of data from the hardware unit 2 to the back-end computer system 5 and from the back-end computer system 5 to the hardware unit 2 is described below with reference to the schematic illustration in FIG. 2.

The gateway security module 10 of the device-proximal gateway 7, the gateway security module 10' of the network-proximal gateway 8, the hardware security module 11 of the back-end computer system 5 and possibly the security controller 14 of the hardware system 2 are able to implement their security functionalities according to at least one common cryptographic system.

In order to transmit data from the hardware component 2 to the back-end computing system 5 an initialization is first carried out, wherein the security controller 14, the two gateway security modules 10, 10 and the hardware security module 11 (or a corresponding security module of a third party, which is intended to act as a data receiver or transmitter) each generate key pairs (consisting of a public and a private key) and exchange the public keys with each other in a secure manner. This initialization phase can take place during the "commissioning" or personalization of the communication module 1, possibly already before the communication module 1 is delivered by the manufacturer. The communication module 1 is immediately ready for use after this initialization phase and has all the data and prerequisites that are required to carry out the method according to the invention. The communication paths for which the communication module 1 is provided are usually established after the initialization phase and do not change subsequently, or can only be changed by deletion and re-initialization.

Data that are transmitted during the operation of the technical system 4 via the internal network 3 (e.g. a CAN bus of a vehicle) can be captured by the device-proximal gateway 7, encrypted by the device-proximal gateway 7 or the network-proximal gateway 8 by the method according to the invention and can be transmitted to the back-end computer system 5. In this case, the device-proximal gateway 7 (or the network-proximal gateway) is basically to be regarded as the end point of the secure transmission chain. The method can be carried out in connection with hardware components that do not have their own security controller 14. This method is referred to as variant A in the description below. The case in which the network-proximal gateway performs the encryption is referred to in the figure as variant A'. For the sake of clarity, however, a detailed description of this variant A' is dispensed with, since the implementation of this variant is within the ability of the average skilled person who is aware of the present disclosure.

In addition, according to the invention, it is also possible to implement a secure connection from the hardware component 2 to the back-end computer system 5 (or to a third-party data receiver or data transmitter downstream of this back-end computer system 5), provided that the corresponding hardware component 2 has a corresponding security controller 14. This option is referred to as variant B in the description below.

According to variant A, the device-proximal gateway 7 generates a secret one-time key using the gateway security module 10 and uses an authenticated encryption function to encrypt the data to be transmitted with the one-time key. The gateway security module 10 then creates a parameter set for a one-pass key exchange, wherein these parameters include a public key of the back-end computer system 5 (or a unit contained therein). The gateway security module 10 encrypts the one-time key using a key wrapping scheme and generates a data envelope packet that contains all of these data.

According to variant B, an independent encryption of the device data can already be carried out by the security controller 14 of the hardware component 2, wherein the corresponding device data are already being transmitted in a secure manner from the hardware component 2 to the device-proximal gateway 7 via the internal network 3 (step 100). The encryption used by the hardware component 2 can be independent of the cryptographic system that is used by the communication module 1. In this case, the communication module 1 applies the encryption according to the invention to device data that have already been encrypted.

The device-proximal gateway 7 transmits the data envelope packet via the (preferably non-routable) point-to-point connection 9 to the network-proximal gateway 8 (step 101).

The network-proximal gateway 8 acts as a publisher and establishes a connection to the broker 20 that is secured in accordance with a network encryption protocol (e.g. TLS), wherein both client authentication and server authentication take place. Then the network-proximal gateway, as publisher, transmits the data envelope packet to a channel (this is also referred to as a subject topic, for example MQTT topic) of the broker (step 102).

The back-end computer system 5 also establishes a connection to the broker 20 that is secured in accordance with a network encryption protocol (for example TLS), acts as a subscriber to the channel, and receives the data envelope packet (step 103). If necessary, the back-end computer system 5 transmits the data envelope packet to a receiver in the back-end computer system 5.

Regardless of the direction of the data transmission, the connection to the broker 20 can be established by the particular publisher as well as by the particular subscriber in accordance with a defined time scheme and/or as required, wherein corresponding roles can be defined for each publisher/subscriber.

At the destination in the back-end computer system 5, the relevant data is extracted from the data envelope, the key-wrapping key is calculated using the one-pass key exchange scheme and the secret key is decrypted using the key-wrapping key. Then the integrity and authenticity of the data are verified and the data themselves are decrypted. In this way, the back-end computer system 5 can either generate the unencrypted device data or the device data in the form encrypted by the hardware component 2.

Figure 2:
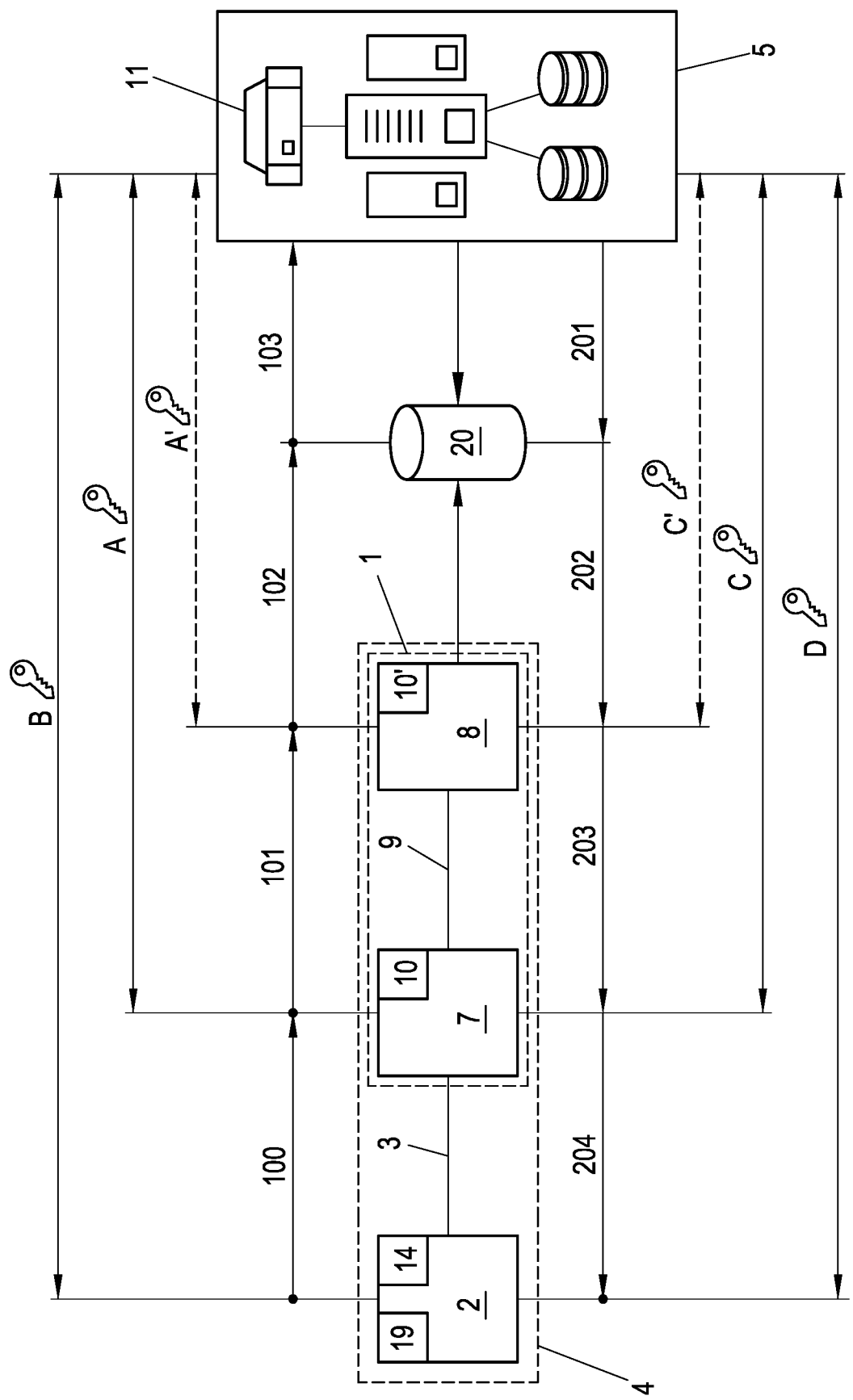
FIG. 2 is a simplified schematic representation of the data transmission path shown in FIG. 1.

In the opposite direction, the communication of data from the back-end computer system 5 to the hardware component 2 can be carried out in an exemplary embodiment according to the steps described below. Two variants are also described for this data transmission, and are referred to herein as variant C and variant C'. In variant C, the encryption extends from the back-end computer system 5 to the device-proximal gateway 7 and in variant C', the secure connection extends from the back-end computer system 5 to the network-proximal gateway 8. In addition, the data transmitted according to the method according to the invention for the hardware component 2 can be encrypted according to its own cryptographic system (wherein such an encryption is created either by the back-end computing system 5 or by an authorized data transmitter). Such an additional encryption is shown in FIG. 2 as variant D.

The relevant unit in the back-end computing system, for example the software repository 15 or the firmware repository 16, in which the data for the transmission are stored, uses the private key in the corresponding hardware security module 11 to create a digital signature for the data to be transmitted which are transmitted to the hardware component 2. The data can include, for example, application software, firmware or parameter data for the hardware component 2. If necessary, this data can already have been stored in encrypted form in the back-end computer system 5, wherein the encryption is carried out, for example, by a manufacturer of the hardware component who is not the owner and administrator of the back-end computer system. In this case, the back-end computer system 5 in connection with the communication module 1 can only offer a highly secure transmission functionality for third parties, in which the encryption which is provided in any case is "overlaid" by a further, highly secure encryption.

The data, including the digital signature(s), are encrypted in the back-end computer system 5, preferably before they leave the unit in question. Using the hardware security module 11, a secret one-time key is generated and an authenticated encryption function is used to encrypt the signed data with the one-time key. A parameter set for a one-pass key exchange is then created in the hardware security module 11, wherein these parameters comprise either the public key of the device-proximal gateway 7 (variant C) or the public key of the network-proximal gateway 8 (variant C'). The one-time key is encrypted using a key-wrapping scheme and a data envelope packet is generated that contains all of these data. As an alternative, the above steps can not only be carried out by the hardware security module 11 of the back-end computer system 5, but also, for example, by an authorized data transmitter. Instead of the hardware security module 11, a software solution can also be used, for example in the form of a soft HSM or a similar system.

The back-end computer system 5 acts as a publisher and establishes a connection to the broker 20 that is secured in accordance with a network encryption protocol, wherein both a client authentication and also a server authentication take place. The back-end computer system 5, as publisher, then transmits the data envelope packet to a channel of the broker (step 201).

The network-proximal gateway 8 also establishes a connection to the broker 20 that is secured in accordance with a network encryption protocol, acts as a subscriber to the channel, and receives the data envelope packet (step 202), wherein both a client authentication and a server authentication take place.

According to variant C', the network-proximal gateway 8 first extracts the relevant data from the data envelope packet using the gateway security module 10'. The key-wrapping key is calculated using the one pass key exchange scheme and the secret key is decrypted using the key-wrapping key. The integrity and authenticity of the data are verified using a public key of the back-end computer system 5 (which is stored in the gateway security module 10') and the data themselves are decrypted and transmitted to the device-proximal gateway 7 via the point-to-point connection 9.

According to variant C, the data envelope packet is transmitted from the network-proximal gateway 8 via the point-to-point connection 9 to the device-proximal gateway 7 (step 203).

The device-proximal gateway 7 extracts the relevant data from the data envelope packet, calculates the key-wrapping key using the one-pass key exchange scheme and decrypts the secret key using the key-wrapping key. The integrity and authenticity of the data are verified and the data are decrypted. If necessary, ensuring the integrity and authenticity of the data can already be integrated into the cryptographic system or can also be implemented in another suitable way.

The device-proximal gateway 7 then transmits (204) the device-proximal data to the hardware component 2. If the hardware component 2 has a security controller 14, the integrity and authenticity of the data can optionally also be checked by the security controller 14, for example using a public key of the back-end computer system 5 or a public key of the location where the data have been created or encrypted. If necessary, the security controller 14 of the hardware component 2 can also perform the decryption of the additional encryption level according to variant D.

In connection with the present disclosure, the "public key of the back-end computer system" refers to all public keys of key pairs whose private key is assigned to a component of the back-end computer system 5 or is stored therein. In particular, such a public key of the back-end computer system 5 can be assigned to the software repository 15 or the firmware repository 16, for example.

Figure 3:
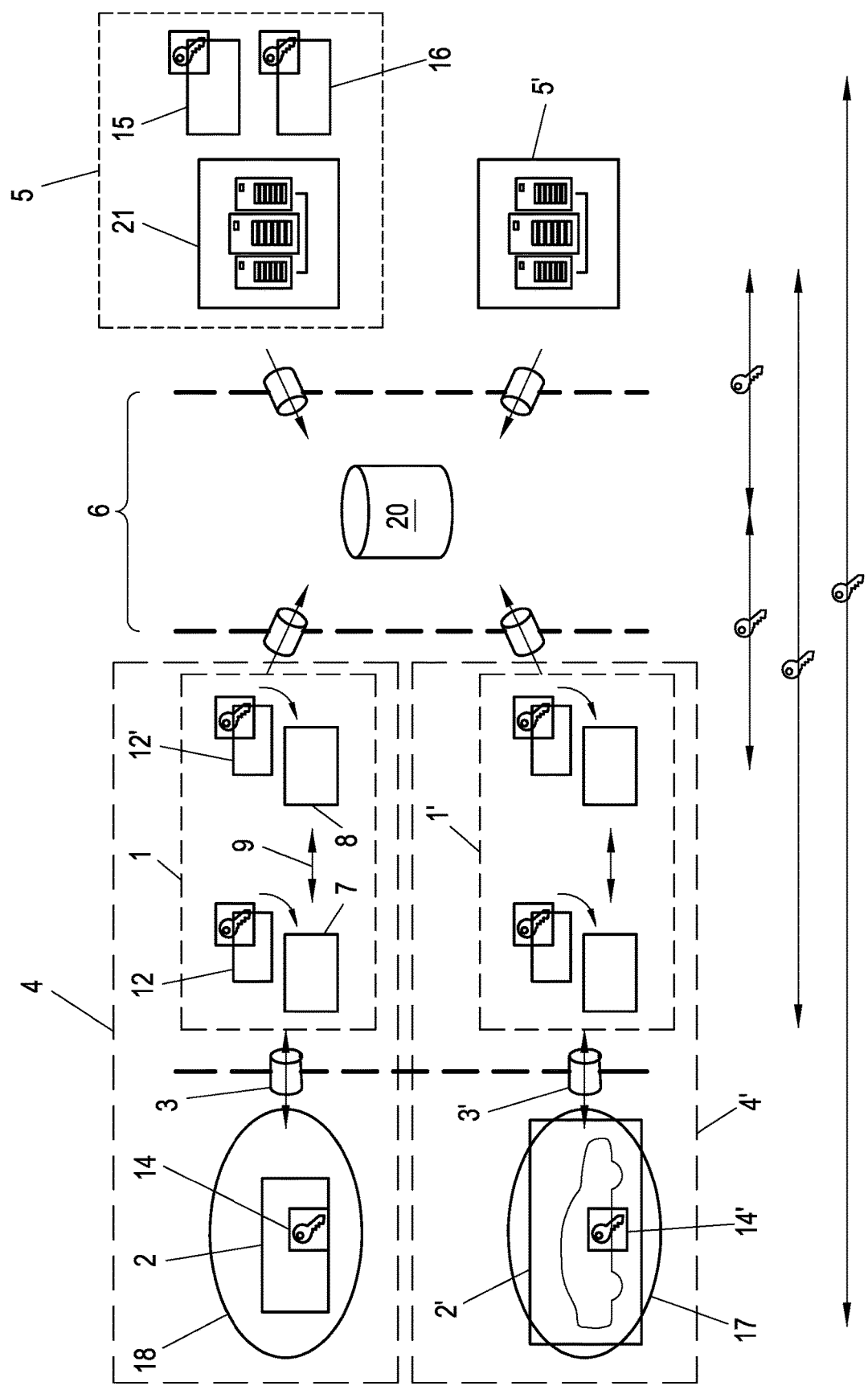
FIG. 3 is a schematic block diagram of a secure communication system between a plurality of back-end computer systems and a plurality of technical systems.

With the aid of the method described above, very complex communication structures can be created, via which numerous technical systems 4 of different types can communicate securely with one or more back-end computer systems 5. FIG. 3 shows, for example, an expanded communication structure with a first technical system 4 and a second technical system 4'. The first technical system 4 can represent, for example, an industrial device 18, for example a test bench or a machine arrangement in which at least one hardware component 2, for example a sensor unit, is provided. Typically, an industrial device includes a variety of hardware components 2 that can be used in conjunction with the teachings of the present invention. The second technical system 4' shown can represent, for example, an autonomous vehicle 17 in which at least one hardware component 2 is contained. Such a vehicle usually contains a large number of hardware components 2, for each of which the teachings according to the invention can be used.

Only two technical systems 4, 4' are illustrated representatively in FIG. 3, but it is clear that the communication infrastructure can support a large number of different and/or similar technical systems.

Examples of technical systems that can be operated advantageously in connection with the present invention include systems of power plant operators, systems of ship lock operators, autonomous, semi-autonomous and conventional vehicles and ships, medical examination systems such as MRI devices and the like, aircraft, production systems, etc.

Examples of hardware components that can be provided in such technical systems include portable exhaust systems (PEMS), vehicle control units, household appliances, PLC systems, sensors and actuators in general, etc.

Each technical system comprises (at least) one communication module 1, 1'. Each communication module 1, 1' has essentially the same basic structure as has already been described in connection with FIG. 1, with a device-proximal gateway 7, a point-to-point connection 9 and a network-proximal gateway 8.

One or more back-end computer systems 5, 5' can be present in the communication infrastructure. For example, communication with hardware components 2 via a communication module 1 can be used by several hardware providers, and/or several back-end computer systems 5 can be provided for different groups of technical systems and/or hardware components. The communication via the packet-switched data network 6 can, for example, be conducted via the same broker 20, but several brokers can also be provided for different communication paths in each case.

The communication infrastructure shown as an example in FIG. 3 allows complete end-to-end encryption between a component of a back-end computing system 5, 5' and the communication module 1 or the hardware component 2 to be established for each supported hardware component 2, 2'. This makes it possible, for example, to prevent hacker attacks which aim at exchanging software or firmware of a hardware component for a corrupted version in the course of transmission via the packet-switched data network 6. Numerous approaches that aim at a hardware-based attack (for example by a side channel attack) on the communication module 1, the internal network 3 or the hardware component 2 are thwarted by the devices and methods according to the invention.

REFERENCE SIGNS communication module 1
hardware component 2
internal network 3
technical system 4
back-end computer system 5
packet-switched data network 6
device-proximal gateway 7
network-proximal gateway 8
point-to-point connection 9
gateway security module 10
hardware security module 11
processor chip card 12
card interface 13
security controller 14
software repository 15
firmware repository 16
vehicle 17
industrial facility 18
device memory 19
broker 20
data center 21

The invention claimed is:

1. A communication module for data transmission between at least one hardware component which is integrated into an internal network of a technical system and a back-end computer system which is connected to a packet-switched data network, characterized in that the communication module comprises:
   a point-to-point connection, wherein communication is carried out via the point-to-point connection according to a non-routable protocol that prevents rerouting of communication and precludes unauthorized access to the internal network,
   a device-proximal gateway is configured and arranged to provide a data transmission interface between the point-to-point connection and the internal network, and
   a network-proximal gateway connected to the device-proximal gateway via the point-to-point connection without intermediate stations, the network-proximal gateway configured and arranged to provide a data transmission interface between the packet-switched data network and the point-to-point connection, wherein the point-to-point connection is the only connection between the network-proximal gateway and the device-proximal gateway, and wherein the network-proximal gateway is directly connected to the packet-switched data network without intermediate stations.

2. The communication module according to claim 1, characterized in that the device-proximal gateway and/or the network-proximal gateway has a gateway security module.

3. The communication module according to claim 2, characterized in that the at least one gateway security module has a card interface configured and arranged to receive a processor chip card.

4. The communication module according to claim 1, wherein the point-to-point connection is a direct connection via a serial bus system.

5. A technical system comprising:
a communication module according to claim 1,
at least one hardware component, and
at least one internal network.

6. The technical system according to claim 5, characterized in that the at least one hardware component has a security controller with an integrated cryptoprocessor, a non-volatile memory and a volatile memory.

7. The technical system according to claim 5, characterized in that the technical system is a vehicle with one of autonomy levels 1 to 5.

8. The technical system according to claim 5, characterized in that the technical system is a machine arrangement configured and arranged to be controlled by an automation system, in particular a test bench.

9. A method for the transmission of device data of a hardware component, which is integrated in an internal network of a technical system, to a back-end computer system which is connected to a packet-switched data network, the method including the following steps:
transmitting the device data from the hardware component via the internal network to a device-proximal gateway,
transmitting the device data from the device-proximal gateway via a point-to-point connection to a network-proximal gateway, wherein communication is carried out via the point-to-point connection according to a non-routable protocol that prevents rerouting of communication and precludes unauthorized access to the internal network, and wherein the point-to-point connection is the only connection between the network-proximal gateway and the device-proximal gateway,
converting the device data into an encrypted instance of the device data by the device-proximal gateway or the network-proximal gateway, and
transmitting the encrypted instance of the device data from the network-proximal gateway via the packet-switched data network to the back-end computer system, wherein the network-proximal gateway encrypts the encrypted instance of the device data before it is transmitted over the packet-switched data network in accordance with a network encryption protocol, and wherein the encrypted instance of the device data contains check data which allows the back-end computing system and/or another authorized data receiver to check the integrity and/or authenticity of the device data.

10. The method according to claim 9, characterized in that the method further includes the following steps:
creating an encrypted instance of the device data using a public key of the back-end computer system by
the device-proximal gateway using the gateway security module of the device-proximal gateway, or
by the network-proximal gateway using the gateway security module of the network-proximal gateway.

11. The method according to claim 9, characterized in that the step of transmitting the encrypted instance of the device data via the packet-switched data network includes transmitting the encrypted instance to a broker in accordance with a protocol that functions purely via push mechanisms.

12. A method for storing update data in a device memory of a hardware component integrated in an internal network, wherein the update data for the hardware component are provided by a back-end computer system and wherein the method including the following steps:
receiving an encrypted instance of the update data by a network-proximal gateway via a packet-switched data network from a back-end computer system,
transmitting the update data from the network-proximal gateway via a point-to-point connection to the device-proximal gateway, wherein communication is carried out via the point-to-point connection according to a non-routable protocol that prevents rerouting of communication and precludes unauthorized access to the internal network and the point-to-point connection is the only connection between the network-proximal gateway and the device-proximal gateway,
transmitting the update data to the hardware component via the internal network,
decrypting the encrypted instance of the update data by the device-proximal gateway or the network-proximal gateway, and
storing the decrypted update data in the device memory of the hardware component, wherein the encrypted instance of the update data contains check data which allows the gateway security module of the device-proximal gateway, and/or the gateway security module of the network-proximal gateway and/or the security controller of the hardware component, to check the integrity and/or authenticity of the update data.

13. The method according to claim 12, characterized in that the encrypted instance of the update data is created by the back-end computer system and/or an authorized data transmitter using a public key of the hardware component and/or the device-proximal gateway and/or the network-proximal gateway.

14. The method according to claim 12, characterized in that the method further includes the following steps:
decrypting the encrypted instance of the update data by the network-proximal gateway using the gateway security module of the network-proximal gateway, or
the device-proximal gateway using the gateway security module of the device-proximal gateway.

15. The method according to claim 12, characterized in that the update data includes firmware, application software and/or parameter data of the hardware component.

16. The method according to claim 12, characterized in that the step of receiving an encrypted instance of the update data includes retrieving the encrypted instance of the update data from a broker and takes place in accordance with a protocol which functions purely via push mechanisms.

* * * * *